United States Patent [19]

McCormick

[11] 3,960,231
[45] June 1, 1976

[54] GARDEN TRACTOR
[75] Inventor: John B. McCormick, Lake City, Fla.
[73] Assignee: Lawrence Peska Associates, Inc., New York, N.Y. ; a part interest
[22] Filed: Oct. 23, 1974
[21] Appl. No.: 517,256

[52] U.S. Cl. .............................. 180/19 R; 172/258; 172/709
[51] Int. Cl.² .......................................... B62D 51/04
[58] Field of Search............ 180/19 R; 172/258, 709

[56] References Cited
UNITED STATES PATENTS

| | | | |
|---|---|---|---|
| 2,688,224 | 9/1954 | Hainke | 180/19 R |
| 2,722,281 | 11/1955 | Falkenberg | 180/19 R |
| 2,772,617 | 12/1956 | Tangeman | 172/709 X |
| 2,803,183 | 8/1957 | Smithburn | 180/19 R X |
| 2,903,077 | 9/1959 | Kamlukin | 180/19 R X |
| 2,941,610 | 6/1960 | Clemson | 180/19 R |
| 3,853,197 | 12/1974 | Quiram | 180/19 R |

FOREIGN PATENTS OR APPLICATIONS

| | | | |
|---|---|---|---|
| 118,035 | 12/1942 | Australia | 180/19 |

Primary Examiner—M. H. Wood, Jr.
Assistant Examiner—John A. Pekar
Attorney, Agent, or Firm—Richard E. Nanfeldt

[57] ABSTRACT

A one wheel garden tractor is capable of pulling a garden sweep, shovel, planter or fertilizer, wherein this garden tractor can be used in narrow and confined areas. The tractor comprises a support frame having rearward extending handle bars and an engine having a vertical drive shaft. A wheel is mounted onto the center of a horizontal axle rod rotatably mounted to the support frame. A clutch assembly and a drive chain assembly join the engine to the horizontal axle rod. A pivotally mounted bracket assembly rearwardly extends from the support frame.

3 Claims, 4 Drawing Figures

U.S. Patent  June 1, 1976  3,960,231
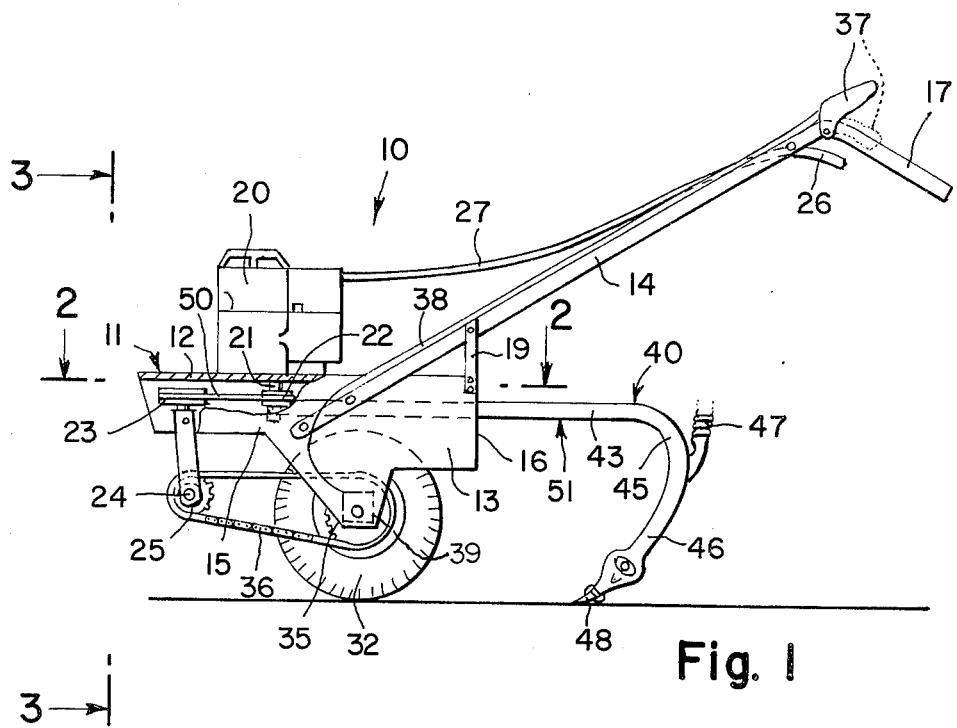
Fig. 1
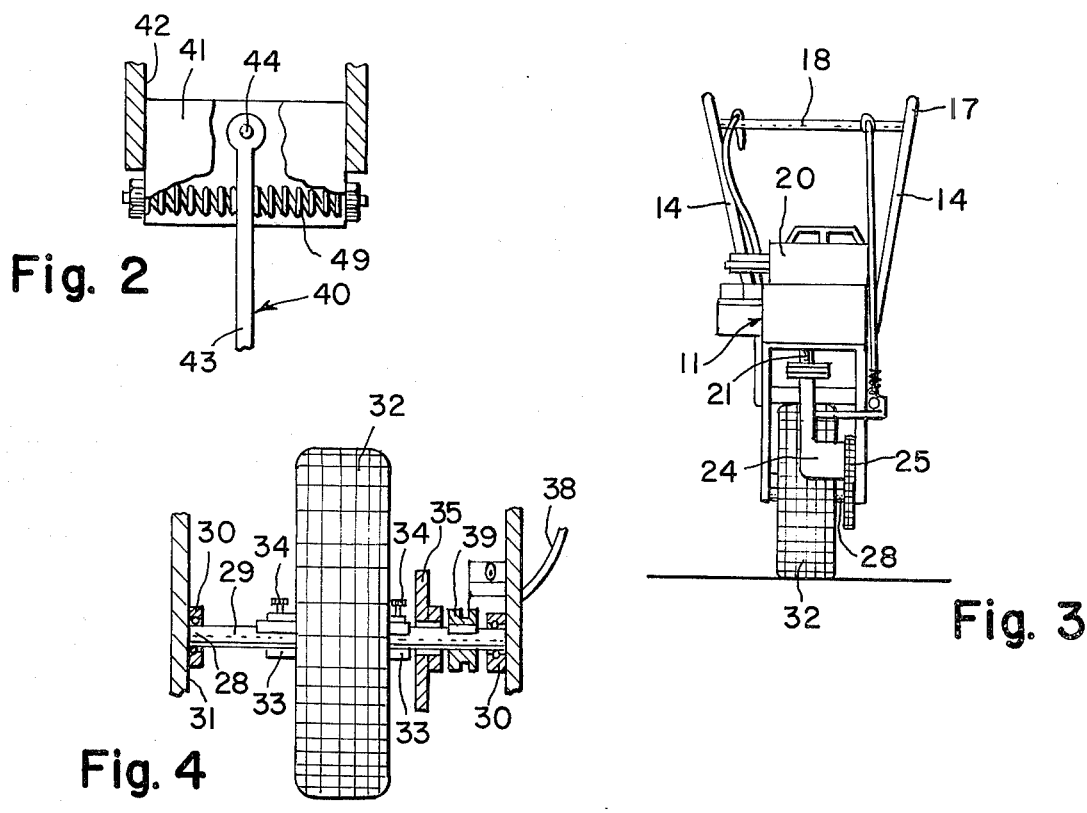
Fig. 2
Fig. 3
Fig. 4

GARDEN TRACTOR

My invention relates to a unique and novel improvement in garden tractors.

A plurality of two wheel garden tractor are commercially available, but these tractors are difficult to use in small and confined areas as in a homeowner's garden, between bushes and along fences.

Accordingly, it is an object of my present invention to provide a one wheel garden tractor capable of being used in narrow confined areas such as in a garden or between bushes.

It is a further object of my invention to provide a one wheel garden tractor of simple design and a relatively low manufacturing cost.

It is a still further object of my present invention to provide a unique means of pivotally mounting a pulling bracket assembly to the support frame of the one wheel garden tractor.

Briefly, my present invention comprises a support frame having rearward extending handle bars and an engine having a vertical drive shaft. A wheel is mounted onto the center of a horizontal axle rod rotatably mounted to the support frame. A clutch assembly and a drive chain assembly join the engine to the horizontal axle rod. A pivotally mounted pulling bracket assembly having a downward extending foot member rearwardly extends from the support frame.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a side elevated view of the garden tractor;

FIG. 2 illustrates a top cross sectional view of the pulling bracket assembly of the garden tractor;

FIG. 3 illustrates a front elevated view of the garden tractor; and

FIG. 4 illustrates a front view of the tire assembly of the garden tractor.

DESCRIPTION OF THE PREFERRED EMBODIMENT

Turning now descriptively to the drawings, in which similar reference characters denote similar elements throughout the several views, FIGS. 1, 3, 4 show a one wheel garden tractor 10 used for gardening in narrow and confined areas. The tractor 10 comprises a support frame housing 11 consisting of a horizontal top plate 12 with a pair of downward extending vertical sidewalls 13. An elongated handle bar 14 affixed to a forward portion 15 of each vertical side wall 13 extends upward at an acute angle from a rear portion 16 of the housing 11, wherein the outer upper end 17 of the handle bar 14 is behind the housing 11. A horizontal cross bar 18 joins together the ends 17 of the two handle bars 14. A vertical support bar 19 is affixed between rear portion 16 of each sidewall 13 and each handle bar 14. An engine 20 having a vertical drive shaft 21 is mounted onto plate 12, wherein shaft 21 extends downward through plate 12. A drive pulley 22 communicates with the drive shaft 21, wherein a horizontally placed V belt 50 communicates between pulley 22 and a downward extending V belt slip type clutch assembly 23. The clutch assembly 23 is mounted forward of pulley 22 under plate 12. A worm reduction gear box 24 is joined to the bottom end of the downward extending clutch assembly 23. A small sprocket wheel 25 is mounted onto the horizontal drive shaft 26 of gear box 24. A throttle control handle 26 mounted on cross bar 18 is joined to a cable 27 leading to engine 20. The ends 28 of a horizontal axle rod 29 are rotatably mounted in a pair of pillar bearing blocks 30 mounted on the inside bottom portion 31 of each sidewall 13 such that rod 29 is rearward of the clutch assembly 23. A tire 32 with a center hub 33 is mounted onto the center of axle rod 29, wherein a pair of adjustable sleeves 34 on each side of hub 33 allow lateral adjustment of tire 32. A large sprocket wheel 35 is mounted onto axle rod 29 between hub 33 and a pillar bearing block 30. A drive chain 36 joins the small sprocket wheel 25 to the large sprocket wheel 35. A clutch control handle 37 pivotally mounted on cross bar 18 is joined to a second cable 38 leading to a slip yoke assembly 39 mounted on the axle rod 29 between the large sprocket wheel 35 and the pillar bearing block 30.

FIGS. 1 and 2 show the pulling bracket assembly 40 for the tractor 10 onto which attaches a plurality of garden implements such as: a sweeper, a shovel, a planter and a fertilizer. A second horizontal cross bar 41 is joined between the rear inside vertical sidewalls 42. A rearward extending horizontal elongated flat bar member 43 is pivotally mounted to the underside of bar 41 with a swivel pin 44, wherein member 43 can be rotated in a horizontal plane. A horizontal spring 49 is mounted between the rear inside vertical sidewalls 42, wherein the spring 49 frictionally engages the bottom base 51 of member 43. To a hooked shaped free end 45 of member 43 is affixed a downward extending adjustable foot member 46 functioning as a balancing force for the tractor 10. The base 48 of the foot member 46 can be formed in the shape of a plow. Referring back to FIG. 1, the ends 17 of the handle bar 14 are rearward of the foot member 46.

Hence obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the U.S. is:

1. A garden tractor, which comprises:
   a. a support frame;
   b. an engine having a vertical drive shaft mounted onto said support frame;
   c. a drive pulley mounted onto said vertical drive shaft;
   d. a worm reduction gear box;
   e. a downwardly extending V belt slip clutch assembly communicating with said worm gear reduction box;
   f. a V belt communicating with said drive pulley and V belt slip clutch assembly;
   g. a small sprocket wheel communicating with said worm gear reduction box;
   h. a horizontal axle rod rotatably affixed to said support frame;
   i. a tire having a center hub mounted onto said horizontal axle;

j. second means for communicating said small sprocket wheel to said horizontal axle;
k. a clutch control assembly;
l. a rearwardly extending elongated rectangularly shaped flat bar member pivotally mounted to said support frame;
m. a horizontally placed spring affixed to said support frame and frictionally engaging said elongated flat bar member, said bar member having a downwardly extending rear hooked end; and
n. an adjustable foot member affixed to said hooked rear end, said foot member adapted to engage the ground.

2. A garden tractor as recited in claim 1, wherein said second means comprises:
a. a large sprocket wheel mounted on said axle rod; and
b. a drive chain joining said large sprocket wheel to said small sprocket wheel.

3. A garden tractor as recited in claim 2, further comprising a handle bar assembly rearwardly extending from said support frame.

* * * * *